Oct. 9, 1962  K. C. ALLEN ET AL  3,057,554
SCALES
Filed Dec. 22, 1958  4 Sheets-Sheet 1
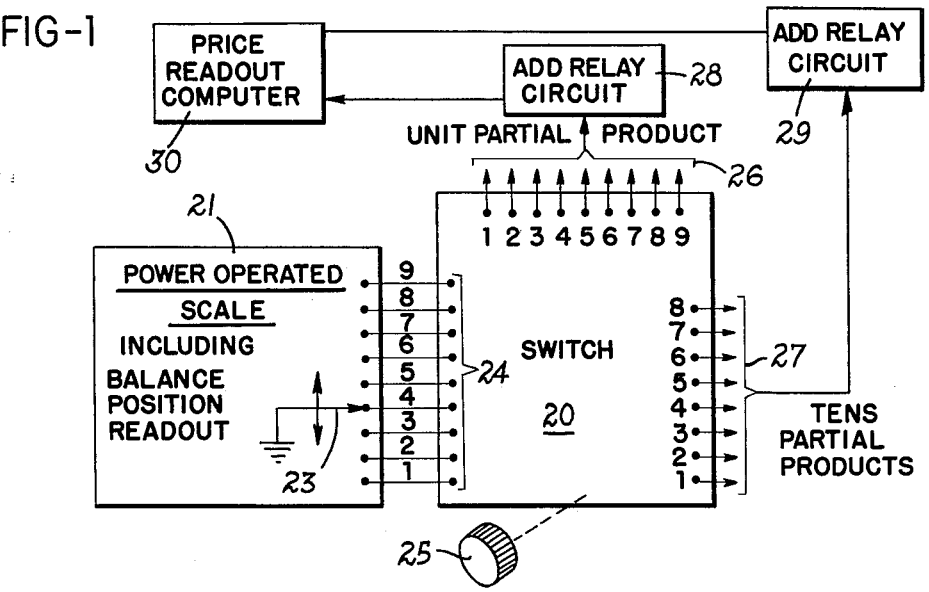
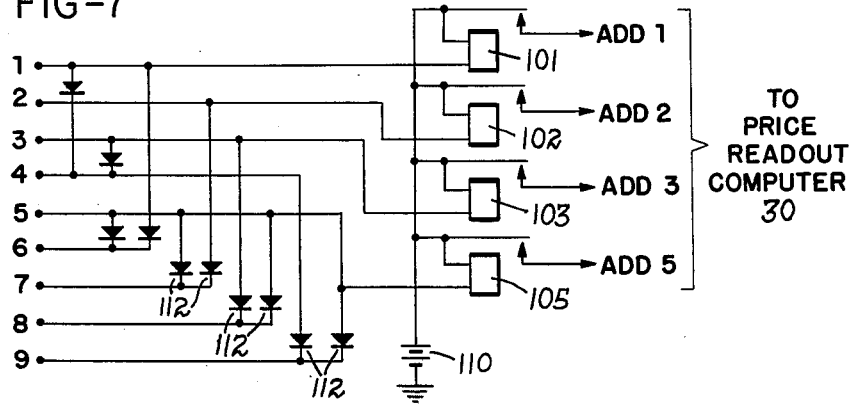
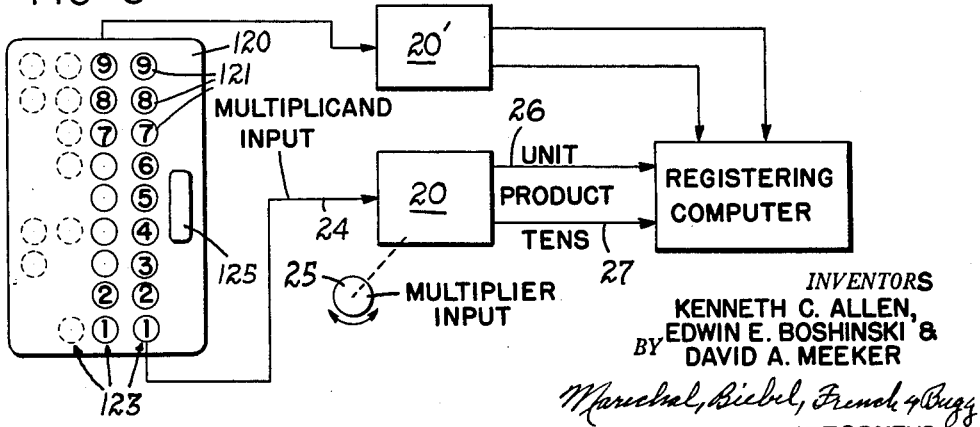
INVENTORS
KENNETH C. ALLEN,
EDWIN E. BOSHINSKI &
BY DAVID A. MEEKER
Marechal, Biebel, French & Bugg
ATTORNEYS Oct. 9, 1962 K. C. ALLEN ET AL 3,057,554
SCALES
Filed Dec. 22, 1958 4 Sheets-Sheet 2
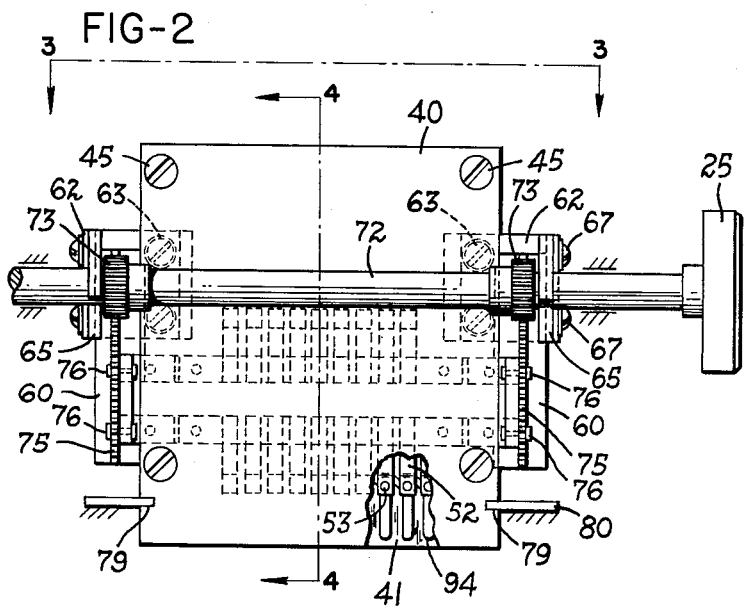
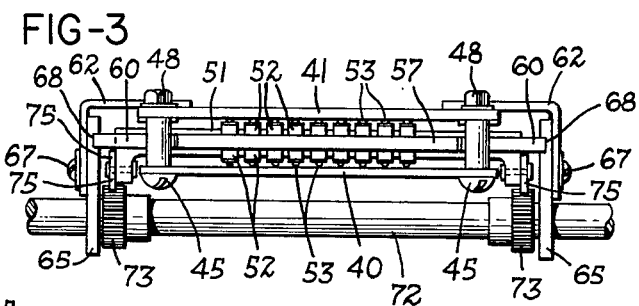
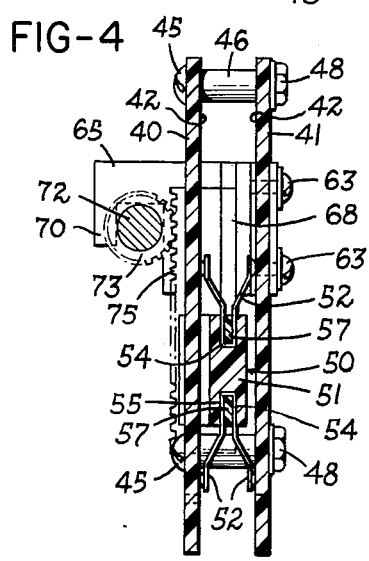
INVENTORS
KENNETH C. ALLEN,
EDWIN E. BOSHINSKI &
DAVID A. MEEKER
BY
Marshal, Biebel, French & Bugg
ATTORNEYS

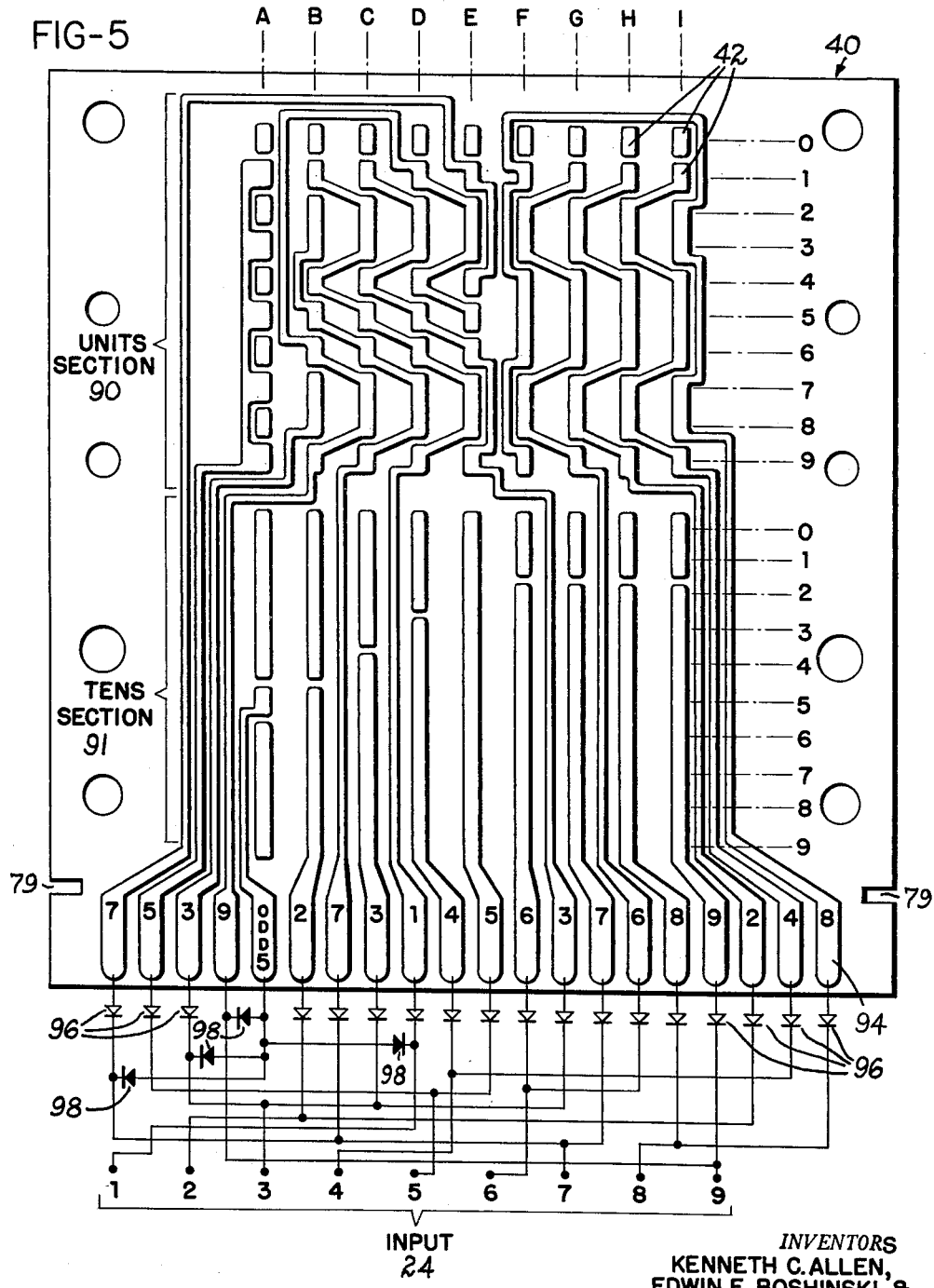

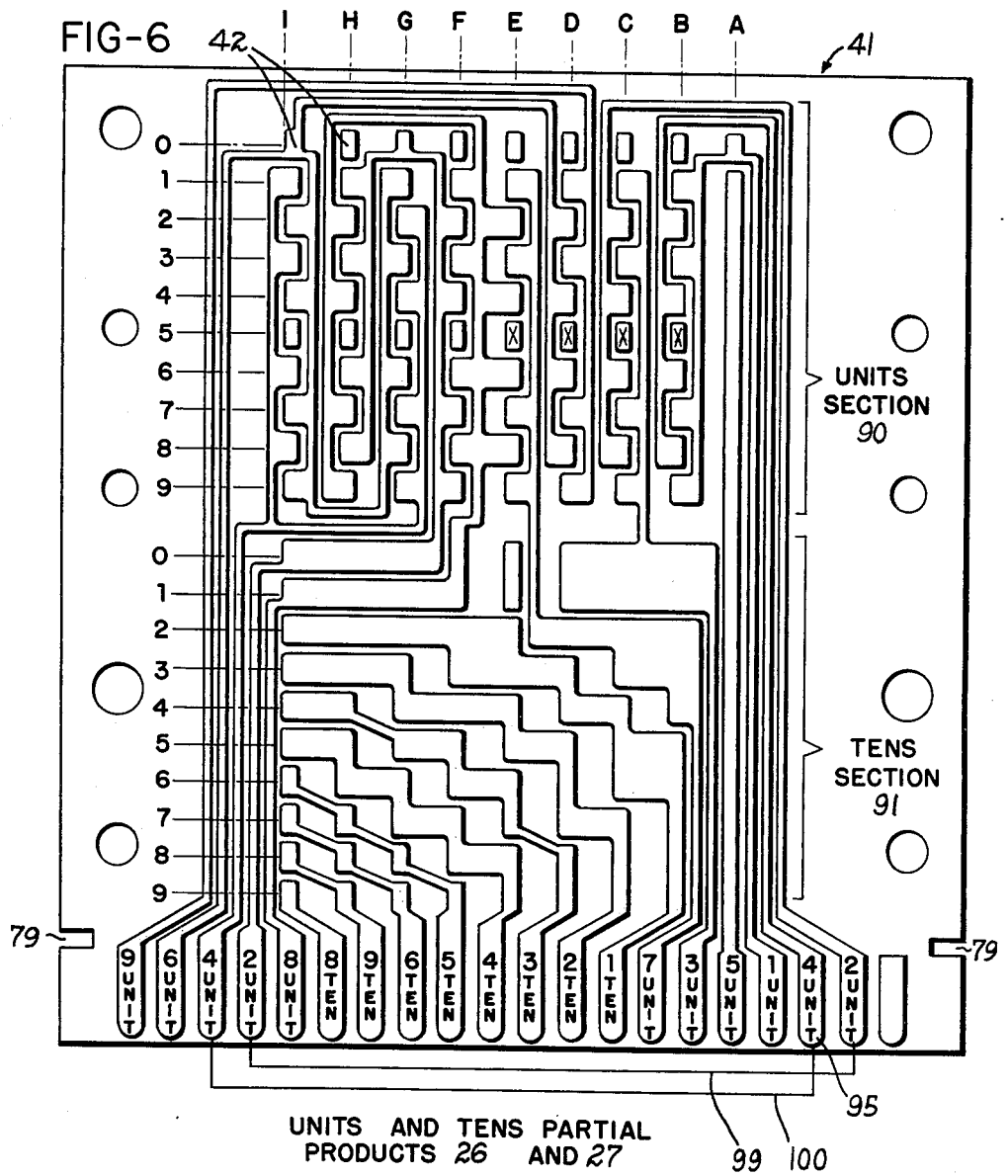

United States Patent Office 3,057,554
Patented Oct. 9, 1962

3,057,554
SCALES
Kenneth C. Allen and Edwin E. Boshinski, Dayton, and David A. Meeker, Troy, Ohio, assignors to The Hobart Manufacturing Company, Troy, Ohio, a corporation of Ohio
Filed Dec. 22, 1958, Ser. No. 782,219
7 Claims. (Cl. 235—160)

This invention pertains to electric circuit components and more particularly to printed circuit switches.

In certain electrical switching applications it is desirable to effect selective closing of a plurality of circuits between a plurality of input and output terminals. One such application is in a precomputed multiplying switch which provides partial product outputs for a given pair of computer inputs representing a multiplier and a multiplicand. Such precomputed multiplying switches usually include a first input consisting of electrical switch connections which represent multiplicands and are selectable by an external electrical circuit, and a second input consisting of a contact selector having selectable positions or stations representing multipliers. Upon the application of an electrical signal to a multiplicand input, the appropriate output connection is energized through the contact selector, which output represents the partial product of the numerical value assigned to the input and the numerical value assigned to the station upon which the contact selector has been preset.

Precomputed multiplying switches of the kind described are useful as product finding devices in computing scale systems wherein a weight read-out device feeds weight information into the multiplicand input and the price per unit weight is set into the multiplier input, and the partial product output from the switch is fed into a suitable computer. The computer sums the partial product information received from a number of such switches and supplies the total to a read-out device or other indicating device.

This invention provides an improved and greatly simplified precomputed multiplying switch utilizing a unique arrangement of printed circuits to provide multiplier and multiplicand inputs, and units and tens partial product outputs. This switch has particular utility as a product finding device in conjunction with a computer such as shown in the copending application of Kenneth C. Allen Serial No. 436,218 entitled "Computing Mechanism" filed June 11, 1954 and assigned to the assignee of this invention. It is therefore an object of this invention to provide a greatly simplified precomputed multiplying switch as outlined above utilizing printed circuit components.

A further object of this invention is to provide an improved printed circuit board switch as outlined above utilizing an input board, an output board, and an adjustable contact carriage to make selective contact with opposite portions of these boards.

Another object of this invention is to provide a switch as outlined above wherein a pair of printed circuit boards are fixedly spaced opposite each other and include complementary printed contacts arranged in transverse stations and selectable by wipers on a carriage movable between the boards.

Another object of this invention is to provide a precomputed multiplying switch as outlined above wherein a first printed circuit board includes provision for multiplicand inputs connected to contacts which are arranged in complementary relation with contacts on a second printed circuit board to provide selectable stations of contacts representing multipliers, with means for electrically connecting complementary stations, and having outputs on the second board representing the units and tens partial products of the selected multiplicand and the selected multiplier.

Other objects and advantages of the invention will be apparent from the following description, the accompanying drawings and the appended claims.

In the drawings—

FIG. 1 is a block diagram showing a switch constructed in accordance with the invention and connected within a computing scale system;

FIG. 2 is a plan view of the switch of FIG. 1;

FIG. 3 is an end view of the switch looking generally as indicated by the arrows in line 3—3 of FIG. 2;

FIG. 4 is a sectional view taken generally along the lines 4—4 of FIG. 2;

FIG. 5 is a plan view of the input circuit board in the switch of FIGS. 2–4;

FIG. 6 is a plan view of the output circuit board;

FIG. 7 is an electrical schematic of a relay adding circuit shown in FIG. 1; and FIG. 8 is a block diagram showing the switch of the invention connected to receive input information from a switch keyboard and to supply output information to a registering computer.

Referring to the drawings, which illustrate a preferred embodiment of the invention, a switch constructed in accordance with the teachings of this invention is diagrammatically indicated at 20 in FIG. 1 as connected to receive signals from a circuit selector device such as a power operated scale 21 which includes provision for balance position read-out. The scale may be of the kind fully described and claimed in Kenneth C. Allen application Serial No. 637,725 entitled "Weighing Scales," filed February 1, 1958 and assigned to the assignee of this invention, wherein a motor driven scale balancing mechanism drives the equivalent of an electrical read-out switch having a grounded wiper contact 23 to close one of a plurality of selectable circuits each representing a unit multiplicand, as shown in simplified form in FIG. 1. The position of the wiper contact is made to correspond to the numerical value of the weight, or the numerical value of one column of several columns of the weight, as indicated by the switch unit input contacts 24 numbered 1 through 9 representing switch multiplicand inputs.

The switch multiplier input is set in by knob 25. A suitable prace or cost index may be included on the knob 25 to permit an operator to determine at a glance the price information set into the system by the position of the knob 25.

The switch 20 includes a units partial products output 26 and a tens partial products output 27, which may be fed to suitable multiple contact plugs or jacks (not shown) for ready connection and disconnection. These outputs are shown as being fed into a pair of add relay circuits 28 and 29 which, in turn, supply signals to a price read-out computer 30. The computer 30 also may be of the kind fully described and claimed in the above application Serial No. 637,725. The computer 30 receives the partial product output from the switch 20 through the add relays and sums these products with products from other circuits, if any, to provide an indicated total price, and registers this total on indicating wheels or on a printed ticket, or both.

Referring particularly to FIGS. 2, 3 and 4, the switch 20 includes an input circuit board 40 and an output circuit board 41 each having fixed circuit patterns 42 printed on one side only. These boards are fixedly spaced with their printed surfaces facing each other. Four spacing bolts 45 are received through the board 40 and include spacing sleeves 46 received on the bolts and between the inside surfaces of the boards 40 and 41. Nuts 48 are threaded on the bolts 45 from the back side of the output board 41 to retain the boards against the spacing sleeves 46.

Means are provided for making circuit contact between opposite complementary portions of the printed circuit patterns 42 of the boards 40 and 41 consisting of a contact carriage 50 reciprocably received between the boards 40 and 41. The carriage 50 includes a dielectric body 51 within which are carried feed through spring wipers 52 arranged in oppositely disposed rows. The wipers 52 include circuit engaging portions 53 and U-shaped heel portions 54. The heel portions 54 are received within a generally rectangular cross sectional slot 55 circumferentially formed in four sides of the body 51. A contact locater plug 57 is tightly received within the heel portions 54 to hold the wipers within the slot 55 in spaced relationship to each other.

Means are provided for guiding the carriage along the length of the boards 40 and 41 in selective incremental movement. Within the slot 55, at the opposite ends of the carriage and normal to the locater plug 57, are received a pair of carriage guides 60. A pair of generally L-shaped supports 62 each have one leg fixed to the outside of the output board 41 by a pair of screws 63. The other leg of the supports 62 is extended along side and normal to the planes of the boards. A rack and pinion guide bracket 65, one for each side of the switch, is attached to each support 62 by a pair of screws 67. A longitudinal guide slot 68 is co-extensively formed in each of the guide brackets 65 and within which the carriage guides 60 are reciprocably received.

Also formed on each of the guide brackets 65 is a shaft retaining arm portion 70 defining a U-shaped opening through which the carriage price selecting shaft 72 is rotatably received. The shaft 72 includes a pair of pinion gears 73 received thereon and spaced from each other to lie within the portions 70. A pair of rack gears 75 are disposed generally parallel to the carriage guides 60 and are secured to the carriage by rivets 76 in engaged relationship to the pinion gears 73. The price selector knob 25 is fixed to the shaft 72 and may be rotated to position the carriage 50 at selected stations between the boards by means of the pinion gear 73 and the rack 75.

The boards 40 and 41 include mounting notches 79 at one end thereof within which may be received a computer frame member 80 as a means by which the switch 20 may fixedly be supported.

With particular reference to FIGS. 5 and 6, the printed circuit boards 40 and 41 each include contact portions 42 arranged into a plurality of generally parallel wiper paths A through I, spaced corresponding to the spacing of the wipers 52. The contact portions 42, which lie along the length of paths A through I, are also arranged into a plurality of transverse station 0 through 9 which represent the selectable carriage positions. The contact stations 0 through 9 are grouped into a units section 90, and are repeated in a tens section 91, for each printed board. Electrical connection to the input board 40 is made at the terminal strip 94 and the outputs of board 41 are brought out at terminal strip 95, each of these strips being engageable, for example, with a suitable plug unit.

Each of the parallel wiper paths A through I is positioned so as to receive one carriage contact or wiper 52 in the units section 90 and one wiper 52 in the tens section 91. The rows of carriage-supported wipers 52 in each section are arranged and spaced from each other so that, given and selected carriage position 0 through 9, one row of wipers lies on the selected carriage position in the units section 90 and the other row lies in the corresponding station in the tens section 91. The transverse stations 0 through 9 numerically represent the multiplier input which is selected by the rotation of the knob 25. The designation on the input terminals 94 represent the numerical value of the unit inputs and, similarly, the numerical designations on the output terminals 95 represent the units and tens partial product outputs.

In the operation of the switch 20, as applied to the computing scale system of FIG. 1, the weight signal from the input 24 is applied to the terminals 94 of the input board through diodes 96 to the correspondingly designated terminals in the units section 90 and through the diodes 96 to the correspondingly designated terminals in the tens section 91. The diodes 96 provide isolation between the inputs and the sections 90 and 91. Upon the selection of a grounded input to the board 40 by the wiper 23, the electrical circuit, which is completed between the boards by the carriage wipers 52, places this signal at selected output board terminals 95. The exact board terminal or terminals, which are thereby passively selected, represent the units and tens partial product of the input multiplicand and the carriage position multiplier.

It is apparent that the forming of printed circuit paths on one side only of the boards 40 and 41 avoids the technical difficulties and expenses inherent in making electrical connections through the boards. However, it is not always expedient to make all the desired electrical connections on the printed surface of the board. Such is the case in the output board 41 where the circuit portions marked with an X represent the unit product "five" of the 5 multiplier times any of the odd multiplicands of 1, 3, 7 and 9. However, since there is no practical means of connecting the X stations to the unit 5 output strip in row A without resorting to some sort of feed through to the back of the board, circuit connections are established external to the input board 40 which operate electrically to duplicate this connection to produce a 5 units output when the product of the 5 multiplier and any of the odd inputs of 1, 3, 7 and 9 is desired.

An "odd 5" station is provided on the input board, in the tens section 91 for convenience, and is electrically connected at stations 5–A on the output board 41 when the carriage rests on the 5 multiplier station. Each of the odd unit inputs 1, 3, 7 and 9 are connected to the "odd 5" through isolation diodes 98. These external connections to the "odd 5" through the diodes 98 provide an electrical substitution for the stations marked X in the 5 units station on the output board 41 in that the occurrence of a signal at any one of the odd unit inputs of 1, 3, 7 and 9 produces a signal at the "odd 5" station which is carried through to the 5 units output on the terminal strip 95.

A further instance of duplication is found on the output board 41 wherein pairs of electrically identical "unit 2" and "unit 4" outputs are connected to each other by jumper wires 99 and 100 external to the board.

The tens and units partial product outputs may be applied directly to an appropriate computing mechanism for summation with partial products from similar switches to arrive at a total product representing the total price. However, it is often desirable to limit the number of computer inputs by read-out means consisting of units and tens partial product add relays. In this instance, four computer 30 inputs are provided for each partial product output and are, together, effective to provide sums from 1 through 9. These inputs are called add 1, add 2, add 3 and add 5, and are energized by the circuit shown in FIG. 7.

Four add relays 101, 102, 103 and 105 have their armatures connected in common to a suitable source of electrical power, represented by battery 110, and to their respective actuating coils. It will be remembered that the wiping contact 23 in the power operated scale 21 is a grounded contact, and therefore, the originating signal is a ground signal. It is, of course, understood that the battery potential may be applied at the wiper 23 and the relay armatures and the coil grounded. This arrangement would necessitate the reversal of the diodes 96, 98 and 112.

The add relays are operated according to the following schedule:

| Units: | Relays |
|---|---|
| 1 | 101. |
| 2 | 102. |
| 3 | 103. |
| 4 | 103 and 101. |
| 5 | 105. |
| 6 | 105 and 101. |
| 7 | 105 and 102. |
| 8 | 105 and 103. |
| 9 | 105, 103 and 101. |

The unit outputs 4, 6, 7, 8 and 9, which employ a combination of add relays to effect summation, are connected to these relays through isolation diodes 112.

It is understood that a similar add relay circuit is employed with the tens partial product output 27 except that the portion of the relay circuit associated with the number 9 is left unconnected or is eliminated. It is further understood that the add relay circuits may conveniently be incorporated into the computer 30, and are, in fact, included as a part of the computer described in the above Allen application Serial No. 436,218.

The present invention is applicable to many other instances where a first numerical value is to be multiplied by a second numerical value and the partial products thereof obtained. FIG. 8 is an example of such an application of the switch 20 wherein a key board input device 120 includes a plurality of individual circuit closing keys 121 arranged in columns 123 in the manner of an adding machine. An actuating bar 125 may be provided as a means by which the identification of the depressed keys is forwarded through the switch 20 to a registering computer 126. Each of the keys 121 in any given column 123 is connected to the corresponding numerical switch input on the input 24, and, for the purpose of explanation, it may be assumed that the switch shown in FIG. 8 is connected to be energized through the right-hand column 123 of the keys. The remaining columns may each be connected to additional switches of the kind disclosed herein to obtain the partial products for the hundredths, tenths, units, etc. inputs represented by the several columns 123, as indicated by the switch 20'. The registering computer 126 adds the partial products of each switch according to their power and provides an appropriate indication of the total product, and a suitable such registering computer is described in the above Allen application Serial No. 436,218.

In the operation of the arrangement shown in FIG. 8, the input supplied to the keyboard device 120 may represent the weight of prepared packages, which weight may have been prerecorded at the time of the package preparation, and to which a unit price is later assigned, to provide the total price for such packages. The price factor is set in on the switch knob 25 as heretofore explained. The weight factor is set into the keyboard device 120, and upon the actuation of the device by the actuating bar 125, the circuits closed by the keys 121 are connected to the registering computer 126 through one or more of the switches 20. The switches 20 passively provide circuit paths representing the partial unit and tens products of the inputs applied thereto as described above.

Thus, the present invention provides a multiplying switch which is of relatively simple construction, easy to manufacture and repair, and which is not readily susceptible to maladjustment since it incorporates only one moving part, i.e. the contact carriage 50 upon which the contacts or wipers 52 are rigidly mounted. Obviously, it is a simple task to substitute new contacts on the carriage or to replace either of the printed circuit boards, and in fact, due to the construction of the input and output terminal strips on these boards which are readily adaptable to receiving conventional circuit plug units, the switches may readily be replaced as entire units if desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a switch for electrical computing circuits wherein partial product unit and tens outputs are selected for a plurality of unit inputs representing multipliers and multiplicands, the combination comprising a first board of dielectric material having formed thereon a fixed conductive pattern including switch contact portions arranged into substantially parallel wiper paths in one direction of said board and into rows of ten switch contact positions transverse of said paths and also including unit input terminals representing multiplicands connected at selected ones of said contact portions, said rows of switch contact positions representing the multiplier unit inputs and being grouped on said board into a unit section and a tens section, a second board of dielectric material having a fixed conductive pattern formed thereon, means fixing said second board in spaced parallel relationship to said first board, said pattern on said second board including switch contact portions arranged into paths and transverse rows complementary to said paths and rows on said first board and further having unit and tens partial product output terminals connected to selected ones of the contact portions thereon, the conductive patterns of each of said boards being correlated so that the connection of corresponding circuit portions at corresponding multiplier contact positions of opposite boards results in the formation of a circuit path to an appropriate one of the output terminals of said second circuit board representing partial products of said multiplier and said multiplicand, a contact carriage received in the space between said boards and reciprocal therebetween selectively into said ten switch contact positions, and said carriage having thereon a first row of transversely arranged feed-through wipers selectively operable to connect portions of complementary rows in said unit section and a second row of transversely arranged feed-through wipers operable to connect portions of complementary rows in said tens section.

2. In a switch, an input circuit board of non-conductive material having formed on one face thereof a pattern of conductive material including at least three carriage stations and defining a plurality of wiper paths in spaced parallel relation transverse to said stations, an output circuit board of non-conductive material fixedly superimposed over said one face of said first board and having formed on the surface thereof facing said first board a plurality of paths and carriage stations complementary to the paths and stations on said first board, a wiper carriage for establishing paths between said input and output boards received between said boards for movement parallel to said paths and carrying electrically connected transversely arranged opposite pairs of contacts registerable with opposite complementary paths at seselected said stations, means for guiding said carriage along the length of said boards, a rack gear on said carriage and a pinion gear received for rotation between said boards for positioning said rack and carriage at any one of said selected stations along the length of said paths.

3. A computing system for forming partial products of a multiplier consisting of at least three separate digits and a multiplicand, comprising a selector device operable to close one of a plurality of selectable circuits each representing a unit value of said multiplicand, a precomputed multiplying switch having an input printed circuit board with a fixed conductive pattern thereon, said pattern being formed into a plurality of contact portions and arranged in at least three transverse switch stations representing each said multiplier digit, said input board further having a plurality of electrically isolated multiplicand unit inputs for connecting corresponding said portions to said circuits, an output printed circuit board having a fixed conductive pattern arranged to form a plurality of contact portions in a plurality of complementary switch stations and a plurality of electrical outputs electrically connected to said portions at said complementary switch stations, the conductive patterns of each of said boards being correlated so that the connection of corresponding circuit portions at corresponding multiplier stations of opposite boards results in the formation of a circuit path to an appropriate one of the outputs of said output circuit board repersenting partial products of said multiplier and said multiplicand, electrical contact means selectively movable into each of said switch stations and provided with contacts to form electrical connections between given corresponding stations of said boards, and product read-out means connected to the outputs of said output board for energization through said switch by said selector device.

4. A computing system for forming partial products of a multiplier consisting of at least three separate digits and a multiplicand, comprising a selector device operable to close one of a plurality of selectable circuits each representing a unit value of said multiplicand, a precomputed multiplying switch having an input printed circuit board with a fixed conductive pattern thereon, said pattern being formed into a plurality of physically separated units and tens contact portions and arranged in at least three transverse switch stations corresponding to said multiplier digits, said input board further having a plurality of electrically isolated multiplicand unit inputs for connecting corresponding said portions to said circuits, an output printed circuit board having a fixed conductive pattern arranged to form a plurality of physically separated units and tens contact portions in a plurality of complementary switch stations and a plurality of electrically isolated unit and tens outputs electrically connected to said portions at said complementary switch stations, the conductive patterns of each of said boards being correlated so that the connection of corresponding circuit portions at corresponding multiplier stations of opposite boards results in the formation of a circuit path to appropriate ones of the units and tens outputs of said output circuit board representing partial products of said multiplier and said multiplicand, a carriage positioned between said boards and having transverse rows of feed through wipers movable into each of said multiplier stations to connect corresponding units and tens portions of each of said boards, and product read-out means connected to the outputs of said output board for energization through said switch by said selector device.

5. A computing system for forming partial products of a price and a weight, comprising a power operated scale having a balance position read-out operable to close one of a plurality of selectable circuits each representing a unit value of said weight, a precomputed multiplying switch having an input printed circuit board with a fixed conductive pattern thereon, said pattern being formed into a plurality of contact portions and arranged in a plurality of transverse switch stations in excess of two representing digital values of price, said input board further having a plurality of electrically isolated weight unit inputs for connecting corresponding said portions to said circuits, an output printed circuit board having a fixed conductive pattern arranged to form a plurality of contact portions in a plurality of complementary switch stations and a plurality of electrical outputs electrically connected to said portions at said complementary switch stations, the conductive patterns of each of said boards being correlated so that the connection of corresponding circuit portions at corresponding price stations of opposite boards results in the formation of a circuit path to an appropriate one of the outputs of said output circuit board representing partial products of said price digit and said weight unit, presettable electrical contact means selectively movable into each of said stations according to the digital value of said price and operable to form electrical connections between given corresponding stations of said boards, and read-out relays connected to the outputs of said output board for energization through said switch by said balance position read-out.

6. A price input switch for a value computing system, comprising a pair of circuit boards each having a conductive pattern forming a plurality of parallel contact paths having switch contact portions formed thereon with said portions being arranged into a multiplicity of selectable transverse stations, means mounting said boards in fixed spaced apart relation with corresponding paths and stations opposite each other, a single contact carriage received between said boards having at least one transverse row of feed-through wipers thereon in spaced electrically insulated relation with the spacing therebetween corresponding to the spacing of said paths and arranged to connect corresponding said circuit portions of said boards, means guiding said carriage for movement parallel to said paths for positioning said row of contacts at selected ones of said stations, electrical input and output terminal means on said boards, and manually settable carriage drive means connected to said carriage and operable to position said carriage on said guide means at selected ones of said stations corresponding to a desired digit representing price.

7. The switch of claim 6 wherein said boards are each divided into corresponding units and tens sections and each having ten said stations representing price digits of zero through nine and wherein said carriage includes two transverse opposite rows of said wipers with one row positioned to engage circuit board portions at stations in said units sections and the other row proportioned to engage corresponding circuit portions in said tens sections.

References Cited in the file of this patent

UNITED STATES PATENTS

| | | |
|---|---|---|
| 1,414,709 | Reisbach | May 2, 1922 |
| 2,672,531 | Stevenson | May 16, 1954 |
| 2,853,565 | Arthur et al. | Sept. 23, 1958 |
| 2,864,554 | Rolph et al. | Dec. 16, 1958 |
| 2,895,672 | Dickinson | July 21, 1959 |
| 2,899,676 | Rivers et al. | Aug. 11, 1959 |

UNITED STATES PATENT OFFICE
CERTIFICATE OF CORRECTION

Patent No. 3,057,554

October 9, 1962

Kenneth C. Allen et al.

It is hereby certified that error appears in the above numbered patent requiring correction and that the said Letters Patent should read as corrected below.

Column 1, line 49, "It is therefore" should appear as the beginning of a new paragraph; column 2, line 46, for "grace" read -- price --; line 61, before "products" insert -- partial --; column 3, line 55, for "station" read -- stations --; line 69, for "and" read -- any --; column 7, line 12, for "repersenting" read -- representing --; column 8, line 57, for "May 16, 1954" read -- March 16, 1954 --.

Signed and sealed this 19th day of March 1963.

(SEAL)
Attest:

ESTON G. JOHNSON
Attesting Officer

DAVID L. LADD
Commissioner of Patents